US010664457B2

(12) United States Patent
Mohammad et al.

(10) Patent No.: US 10,664,457 B2
(45) Date of Patent: May 26, 2020

(54) SYSTEM FOR REAL-TIME DATA STRUCTURING AND STORAGE

(71) Applicant: BANK OF AMERICA CORPORATION, Charlotte, NC (US)

(72) Inventors: Assim Syed Mohammad, Fremont, CA (US); Badri V. Mangalam, South Barrington, IL (US); Prasanna Joshi, Piscataway, NJ (US); Sridhar M. Seetharaman, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 1122 days.

(21) Appl. No.: 14/871,069

(22) Filed: Sep. 30, 2015

(65) Prior Publication Data

US 2017/0091859 A1 Mar. 30, 2017

(51) Int. Cl.
*G06Q 40/02* (2012.01)
*G06F 16/215* (2019.01)
*G06F 16/23* (2019.01)

(52) U.S. Cl.
CPC ........ *G06F 16/215* (2019.01); *G06F 16/2365* (2019.01); *G06Q 40/02* (2013.01)

(58) Field of Classification Search
CPC ......... G06F 17/30699; G06F 17/30702; G06F 17/30696
See application file for complete search history.

(56) References Cited

U.S. PATENT DOCUMENTS

| | | |
|---|---|---|
| 5,719,942 A | 2/1998 | Aldred et al. |
| 5,757,895 A | 5/1998 | Aridas et al. |
| 6,243,753 B1 | 6/2001 | Machin et al. |
| 6,563,821 B1 | 5/2003 | Hong et al. |
| 7,603,358 B1 | 10/2009 | Anderson et al. |
| 7,707,163 B2 | 4/2010 | Anzalone et al. |
| 8,447,722 B1 | 5/2013 | Ahuja et al. |
| 8,682,925 B1 | 3/2014 | Marquardt et al. |
| 8,868,444 B2 | 10/2014 | Morris et al. |
| 8,943,145 B1 | 1/2015 | Peters et al. |
| 9,203,860 B1 | 12/2015 | Casillas et al. |
| 9,467,476 B1 | 10/2016 | Shieh et al. |
| 2006/0010142 A1 | 1/2006 | Kim et al. |
| 2006/0015390 A1 | 1/2006 | Rijsinghani et al. |
| 2008/0301175 A1 | 12/2008 | Applebaum et al. |
| 2009/0006309 A1 | 1/2009 | Hunt et al. |
| 2009/0248749 A1 | 10/2009 | Gu et al. |

(Continued)

*Primary Examiner* — James Trujillo
*Assistant Examiner* — Kurt A Mueller
(74) *Attorney, Agent, or Firm* — Michael A. Springs; Moore & Van Allen PLLC; Anup Shrinivasan Iyer

(57) ABSTRACT

Embodiments of the invention are directed to systems, methods, and computer program products for real-time data structuring and storage. The system is configured for retrieving data associated with the first user interaction in real-time via an established communication link with one or more interaction channels accessible to the first user; transform the data from an unstructured format to a structured format; process the structured data to identify a pattern associated with the first user interaction; compare the pattern to one or more goals associated with the first user; determine one or more actions to be performed by the first user to achieve the goal; and communicate the information associated with the one or more actions to the first user.

18 Claims, 6 Drawing Sheets

(56) References Cited

U.S. PATENT DOCUMENTS

| | | |
|---|---|---|
| 2009/0276368 A1 | 11/2009 | Martin et al. |
| 2009/0319562 A1 | 12/2009 | Holm-Petersen et al. |
| 2010/0312884 A1 | 12/2010 | Nandy et al. |
| 2011/0055250 A1 | 3/2011 | Nandy et al. |
| 2011/0137789 A1* | 6/2011 | Kortina ............... G06Q 20/405 705/38 |
| 2011/0191361 A1 | 8/2011 | Gupta et al. |
| 2012/0191642 A1 | 7/2012 | George |
| 2012/0323954 A1 | 12/2012 | Bonalle et al. |
| 2013/0152088 A1 | 6/2013 | Gkantsidis et al. |
| 2013/0212420 A1 | 8/2013 | Lawson et al. |
| 2013/0239026 A1 | 9/2013 | Farooque et al. |
| 2014/0040306 A1 | 2/2014 | Gluzman Peregrine et al. |
| 2014/0156634 A1 | 6/2014 | Buchmann et al. |
| 2014/0351233 A1 | 11/2014 | Crupi et al. |
| 2015/0038156 A1 | 2/2015 | Kilpatrick, II et al. |
| 2015/0264063 A1 | 9/2015 | Jenson |
| 2015/0302398 A1 | 10/2015 | Desai et al. |
| 2016/0127454 A1 | 5/2016 | Maheshwari et al. |
| 2016/0269425 A1 | 9/2016 | Shieh et al. |
| 2017/0046146 A1 | 2/2017 | Jamjoom et al. |
| 2017/0111220 A1 | 4/2017 | Kumar et al. |

\* cited by examiner

INTERFACE 600

USER 1

PROFILE 602

ACCOUNTS/CONTACTS WITH ENTITY

TOP OPPORTUNITIES 604

OPPORTUNITY 1
OPPORTUNITY 2
OPPORTUNITY 3

RELATIONSHP SUMMARY 606

CREDIT CARD

BROKERAGE ACCOUNT

MORTGAGE

CHECKING ACCOUNT

RECENT ACTIONS 608

ACTION 1 – DATE
ACTION 2 – DATE
ACTION 3 – DATE
ACTION 4 – DATE

CHANNEL USAGE 610

CHANNEL 1 – AMOUNT
CHANNEL 2 – AMOUNT
CHANNEL 3 – AMOUNT
CHANNEL 4 – AMOUNT

KEY ENROLLED SERVICES 612

| SUMMARY | PROFILE | ACCOUNTS | HISTORY | MORE |

SYSTEM FOR REAL-TIME DATA STRUCTURING AND STORAGE

FIELD

The present application relates generally to real-time data structuring and storage. Specifically, the present application relates to analysis of information aggregated from customer interaction in real-time.

BACKGROUND

The emergence of new technologies has changed the way consumers interact with organizations they choose to do business with. Companies today are using multiple channels to interact with customers and are taking steps to amplify the voice of the customer within their organizations. Customer interaction management systems are typically used to handle communication across multiple different interaction channels and align resources to match the business objectives of the organization.

There is a need for a system for real-time data structuring and storage.

BRIEF SUMMARY

Embodiments of the present invention address the above needs and/or achieve other advantages by providing apparatuses (e.g., a system, computer program product, and/or other device) and methods for real-time data structuring and storage.

In one aspect, a system for real-time data structuring and storage is presented. The system comprises at least one non-transitory storage device; at least one processor; and at least one module stored in said storage device and comprising instruction code that is executable by the at least one processor and configured to cause said at least one processor to: establish a communication link with one or more interaction channels, wherein the one or more interaction channels are capable of being accessed by a first user using a first user device, wherein the one or more interaction channels are associated with a financial institution; determine a first user interaction associated with at least one of the one or more interaction channels; retrieve data associated with the first user interaction in real-time via the established communication link, wherein the data is in an unstructured data format; transform the data from the unstructured data format to a structured data format; process the structured data to identify a pattern associated with the first user interaction; compare the pattern with one or more predetermined patterns, wherein the one or more predetermined patters are associated with one or more goals; determine a goal associated with the first user based on at least comparing the pattern with the one or more predetermined patterns; establish a communication link with a second user device to initiate a presentation of an action interface for display on the second user device, wherein the action interface comprises one or more actions to be performed by the second user, wherein the one or more actions aid the first user to achieve the determined goal; and establish a direct communication link between the second user device and the first user device to communicate information associated with the one or more actions from the second user device to the first user to enable the first user achieve the goal.

In some embodiments, the one or more interaction channels comprises an authenticated channel and an unauthentication channel, wherein authenticated channels are interaction channels directly associated with the financial institution, wherein the unauthenticated interaction channels are indirectly associated with the financial institution, whereby the data received via the established communication link with the authentication interaction channel is more reliable than the data received via the established communication link with the unauthenticated interaction channel.

In some embodiments, the data received from each of the one or more interaction channels are associated with a confidence level, wherein the confidence level associated with data received from authenticated channels is greater than the confidence level associated with the data received from unauthenticated channels, wherein the confidence levels are an indication of the reliability of the data.

In some embodiments, the module is further configured to retrieve one or more templates for data taxonomy from a database, wherein each of the one or more templates comprises one or more fields; parse the data based on at least the one or more fields associated with the one or more templates; and transform the data into a structured format based on at least parsing the data into the one or more fields associated with the one or more templates.

In some embodiments, the module is further configured to place the structured data associated with each of the one or more interaction channels accessed by the first user in one or more queues, wherein the each structured data is queued until a pattern associated with the first user interaction is identified.

In some embodiments, wherein the module is further configured to transform the data received from each of the one or more interaction channels from an unstructured format to a structured format; and store the structured data in a financial institution database.

In some embodiments, the module is further configured to: retrieve data associated with each of the one or more interaction channels accessed by the first user in real-time via the established communication link; dynamically transform the data from an unstructured format to a structured format; place the structured data into one or more queues; and identify the pattern based on at least the structured data placed in the one or more queues and structured data stored in the financial institution database.

In another aspect, a computer program product for real-time data structuring and storage. The computer program product comprising a non-transitory computer-readable medium comprising code causing a first apparatus to: receive an indication from a user to initiate a will generation application on a user system; establish a communication link with one or more interaction channels, wherein the one or more interaction channels are capable of being accessed by a first user using a first user device, wherein the one or more interaction channels are associated with a financial institution; determine a first user interaction associated with at least one of the one or more interaction channels; retrieve data associated with the first user interaction in real-time via the established communication link, wherein the data is in an unstructured data format; transform the data from the unstructured data format to a structured data format; process the structured data to identify a pattern associated with the first user interaction; compare the pattern with one or more predetermined patterns, wherein the one or more predetermined patters are associated with one or more goals; determine a goal associated with the first user based on at least comparing the pattern with the one or more predetermined patterns; establish a communication link with a second user device to initiate a presentation of an action interface for display on the second user device, wherein the action interface comprises one or more actions to be performed by the second user, wherein the one or more actions aid the first user to achieve the determined goal; and establish a direct communication link between the second user device and the first user device to communicate information associated with the one or more actions from the second user device to the first user to enable the first user achieve the goal.

In yet another aspect, a computer implemented method for real-time data structuring and storage is presented. The method comprising establishing a communication link with one or more interaction channels, wherein the one or more interaction channels are capable of being accessed by a first user using a first user device, wherein the one or more interaction channels are associated with a financial institution; determining a first user interaction associated with at least one of the one or more interaction channels; retrieving data associated with the first user interaction in real-time via the established communication link, wherein the data is in an unstructured data format; transforming the data from the unstructured data format to a structured data format; processing the structured data to identify a pattern associated with the first user interaction; comparing the pattern with one or more predetermined patterns, wherein the one or more predetermined patters are associated with one or more goals; determining a goal associated with the first user based on at least comparing the pattern with the one or more predetermined patterns; establishing a communication link with a second user device to initiate a presentation of an action interface for display on the second user device, wherein the action interface comprises one or more actions to be performed by the second user, wherein the one or more actions aid the first user to achieve the determined goal; and establishing a direct communication link between the second user device and the first user device to communicate information associated with the one or more actions from the second user device to the first user to enable the first user achieve the goal.

BRIEF DESCRIPTION OF THE DRAWINGS

Figure 1:
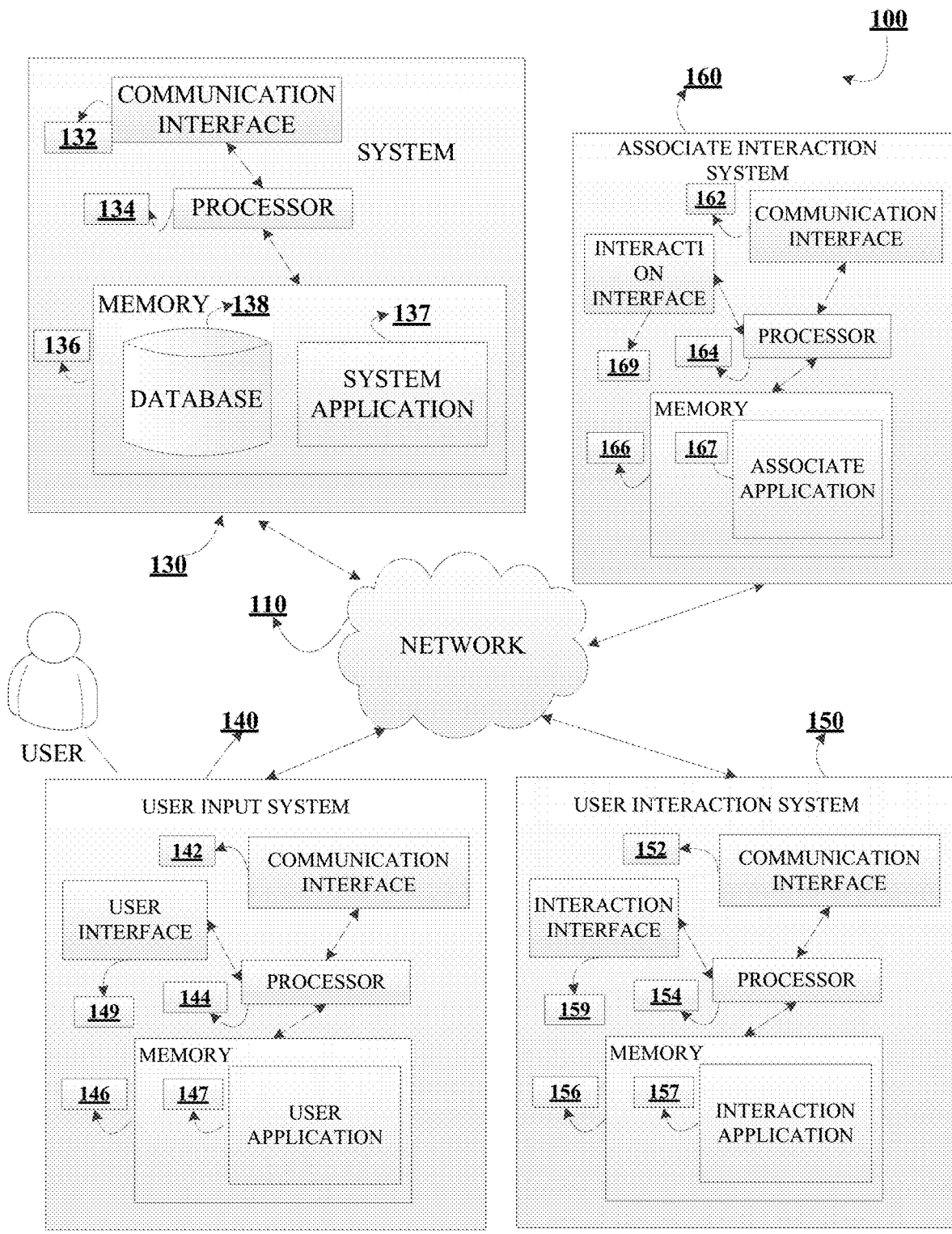
Figure 2:
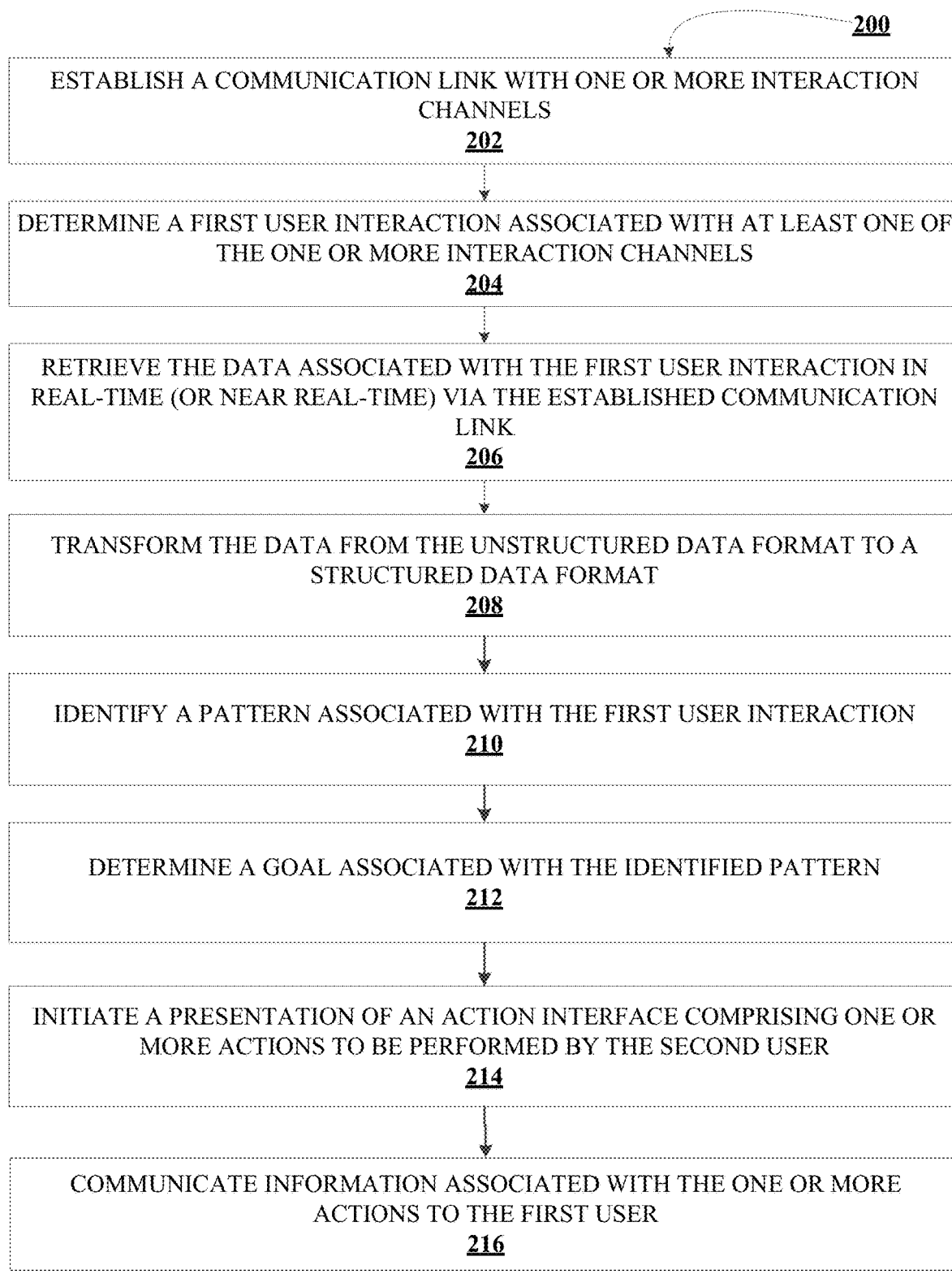
Figure 3:
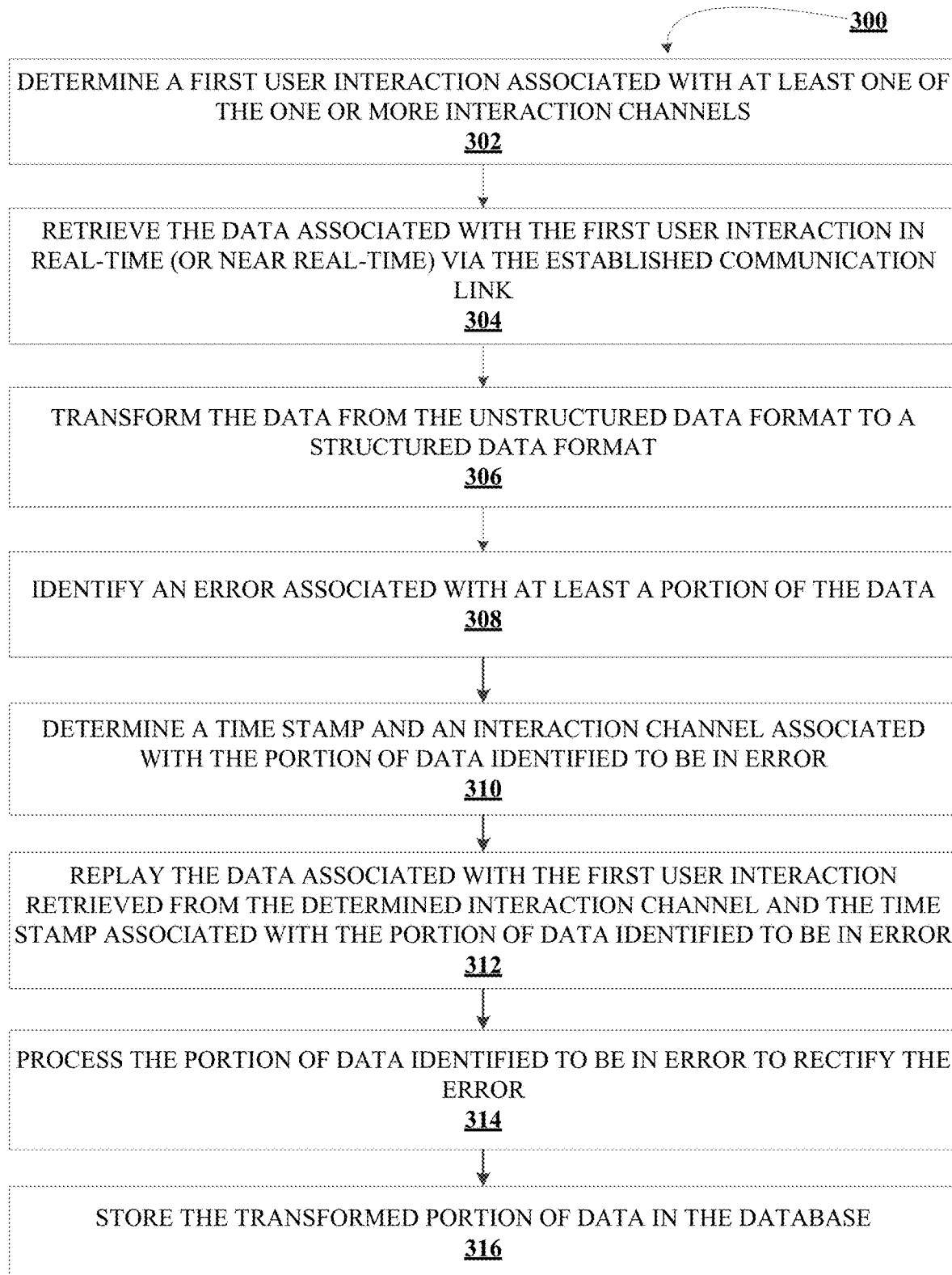
Figure 5:
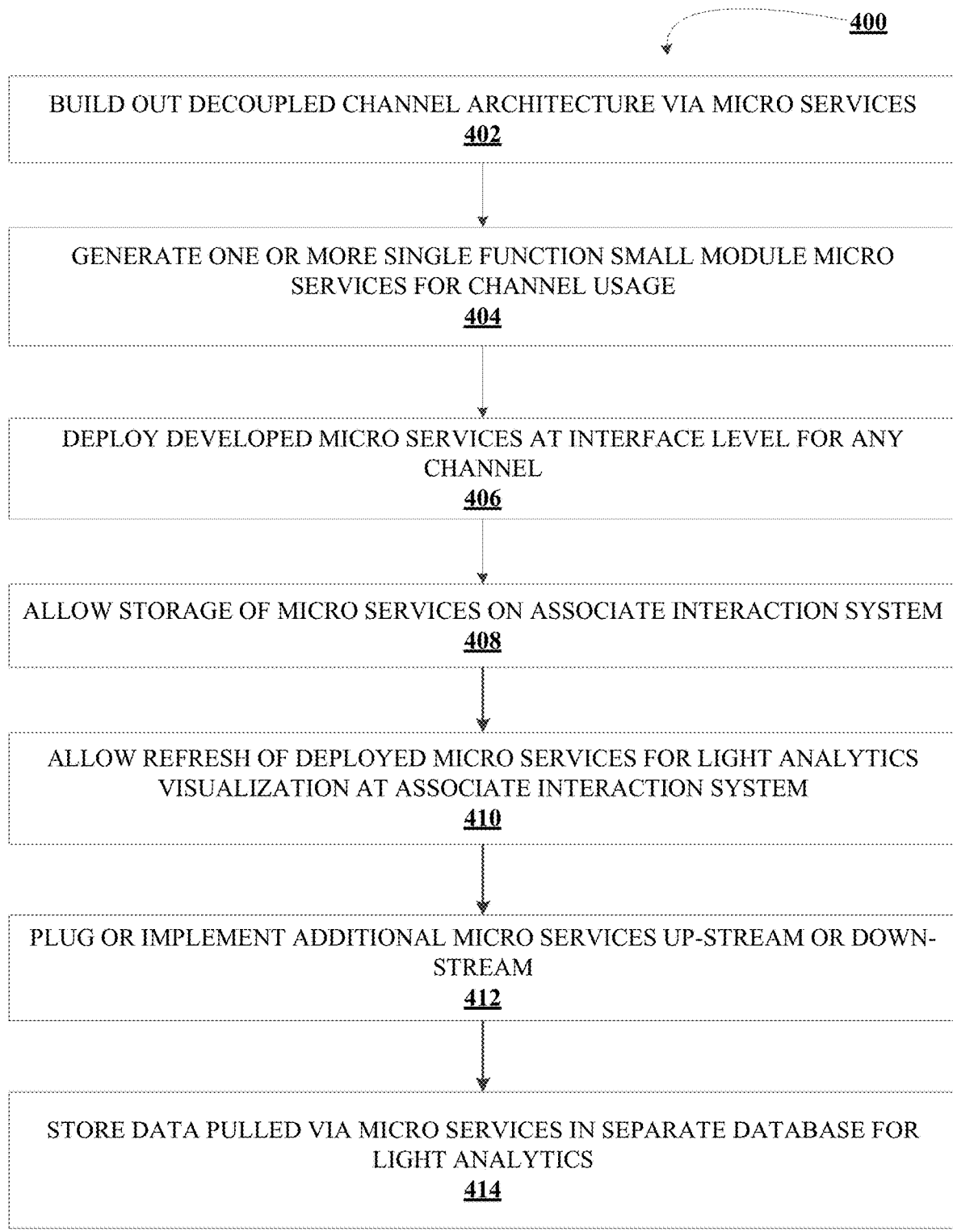
Figure 6:
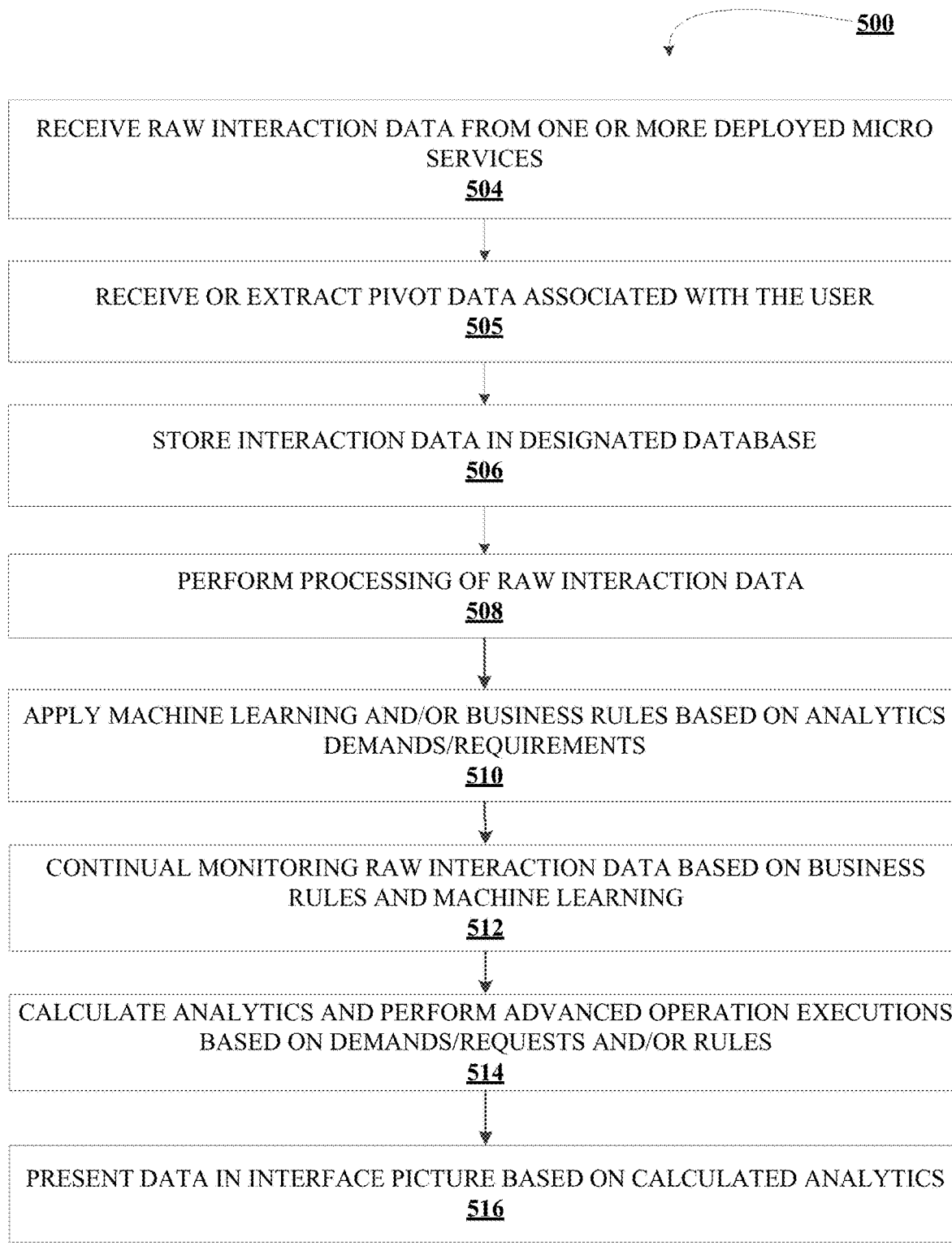

Having thus described embodiments of the invention in general terms, reference will be made to the accompanying drawings, where:

FIG. 1 illustrates a an exemplary block diagram of the system environment for implementing the process flows described herein in accordance with embodiments of the present invention;

FIG. 2 illustrates a high level process flow for real-time data structuring and storage, in accordance with an embodiment of the invention;

FIG. 3 illustrates a process flow for aggregation information associated with a user interaction, in accordance with an embodiment of the invention;

FIG. 4 illustrates a user interface, in accordance with an embodiment of the invention;

FIG. 5 illustrates a process flow for providing a channel accessible single function micro service data collection process used for light analytics, in accordance with an embodiment of the invention; and FIG. 6 illustrates a process flow for a micro services data processing analytics framework, in accordance with an embodiment of the invention

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, an "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity.

As used herein, a "user" may be an entity customer (e.g., an account holder or a person who have an account (e.g., banking account, credit account, or the like)). In one aspect, a user may be any financial institution customer associated with the financial institution or any other affiliate entities associated with the financial institution. In some embodiments, the user may be an individual who may be interested in conducting business with an entity or opening an account with the financial institution. In some other embodiments, a user may be any individual who may be interested in enrolling in a specific financial program offered by the financial institution. For purposes of this invention, the term "user" and "customer" may be used interchangeably.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, a "web portal" is a specially designed web page that brings information together from a variety of sources in a uniform way. Typically, each information source is designed to have a dedicated area on the page for displaying information. The extent to which content is displayed in a "uniform way" may depend on the intended user and the intended purpose, as well as the diversity of the content. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Embodiments of the invention are directed to a system, method, or computer program product for a creating a channel accessible single function micro service data collection process used for light analytics. The micro services are generated for a specific single function, then deployed and stored at an associate device. The micro services require specific programming and are generated for a specific data collection process light analytics function. The single function micro service is deployed to an associate system where it extracts data for data collection. The micro services translate the extracted data into a readable format and transmit, via secure communication network, the translated data to a custom build database for subsequent light analytics framework implementation.

FIG. 1 presents a system environment 100 for implementing the process flows described herein in accordance with embodiments of the present invention. As illustrated, the system environment 100 includes a network 110, a system 130, a user input system 140, associate interaction system 160, and a user interaction system 150. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, the user input system 140, associate interaction system 160, and the user interaction system 150 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein.

The communication interface 142 generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, Wi-Fi triangulation system, or the like) may enable at least the user input system 140 or an external server or computing device in communication with the user input system 140 to determine the location (e.g. location coordinates) of the user input system 140.

The processor 144 generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

The memory 146 is used for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments the input/output devices may be the same device or a combination of devices that allow for the input or output of information to or from the user. In some embodiments, the user interface 149 includes the input and display devices of a mobile device, which are operable to receive and display information.

As shown in FIG. 1, the user interaction system 150 may include any computerized apparatus that can be configured to perform any one or more of the functions of the user interaction system 150 described and/or contemplated herein. For example, the user may use the user interaction system 150 to transmit and/or receive information or commands to and from the system 130. In some embodiments, for example, the user interaction system 150 may include an Automated Teller Machine (ATM), remote Interactive Voice Response (IVR), a network device, a mobile device, a wearable device, telephone networks, and/or the like. As illustrated in FIG. 1, in accordance with some embodiments of the present invention, the user interaction system 150 includes a communication interface 152, a processor 154, a memory 156 having an interaction application 157 stored therein, and an interaction interface 159. In such embodiments, the communication interface 152 is operatively and selectively connected to the processor 154, which is operatively and selectively connected to the interaction interface 159 and the memory 156. In some embodiments, the user may use the interaction application 157 to execute processes described with respect to the process flows described herein. Specifically, the interaction application 157 executes the process flows described herein.

The communication interface 152 generally includes hardware, and, in some instances, software, that enables the user interaction system 150, to transport, send, receive, and/or otherwise communicate information to and/or from the interaction interface of one or more other systems on the network 110. For example, the communication interface 152 of the user interaction system 150 may include a wireless transceiver, modem, server, electrical connection, and/or other electronic device that operatively connects the user interaction system 150 to another system such as the system 130. The wireless transceiver may include a radio circuit to enable wireless transmission and reception of information. Additionally, the user interaction system 150 may include a positioning system. The positioning system (e.g. a global positioning system (GPS), a network address (IP address) positioning system, a positioning system based on the nearest cell tower location, Wi-Fi triangulation system, or the like) may enable at least the user interaction system 150 or an external server or computing device in communication with the user interaction system 150 to determine the location (e.g. location coordinates) of the user interaction system 150.

The processor 154 generally includes circuitry for implementing the audio, visual, and/or logic functions of the user interaction system 150. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the interaction application 157 of the memory 156 of the user interaction system 150.

The memory 156 is used for storing the interaction application 157 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may utilize the volatile memory over the non-volatile memory by storing multiple pieces of information in the volatile memory, thereby reducing the load on the system and increasing the processing speed.

As shown in FIG. 1, the memory 156 includes the interaction application 157. In some embodiments, the interaction application 157 includes an interface for communicating with, navigating, controlling, configuring, and/or using the user interaction system 150. In some embodiments, the interaction application 157 includes computer-executable program code portions for instructing the processor 154 to perform one or more of the functions of the interaction application 157 described and/or contemplated herein. In some embodiments, the interaction application 157 may include and/or use one or more network and/or system communication protocols.

Also shown in FIG. 1 is the interaction interface 159. In some embodiments, the interaction interface 159 includes one or more output devices, such as a display and/or speaker, for presenting information to the user. In some embodiments, the interaction interface 159 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments the input/output devices may be the same device or a combination of devices that allow for the input or output of information to or from the user. In some embodiments, the interaction interface 159 includes the input and display devices of a mobile device, which are operable to receive and display information.

FIG. 1 also illustrates a system 130, in accordance with an embodiment of the present invention. In accordance with some embodiments, for example, the system 130 may include a computer network, an engine, a platform, a server, a database system, a front end system, a back end system, a personal computer system, and/or the like. Therefore, the system 130 may be a server managed by the entity (e.g., a business). The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

The system 130 via the system application may initiate building out a decoupled channel architecture. Typical channel architectures are tightly coupled, thus when an update or change is implemented to one or more parts of the architecture, it is not known what effect that change will have on other parts of the tightly coupled infrastructure. Thus, generating or initiating a process of creating a decoupled channel architecture.

In some embodiments, the system application 137 may generating one or more single function small module micro services for channel use. These micro services are created to provide one function within the data collection process. The micro services are built by the system application 137 as small transferable modules to be a single function high efficiency small module. In this way, the constructed micro services do not require high end server networks to run, but instead run via a simplistic process within an associate interaction system 160 or user interaction system 150.

In some embodiments the system application 137 may deploy the developed micro services at the interface level for any channel via the network 110 to the associate interacting system 160 and/or the user interaction system 150. The deployed micro services may pull data frequently and create a light analytic system. For example, a micro service can pull all data within a time frame that when to a specific channel, when to a specific channel for a particular purpose, or the like. The micro services will refresh regularly and pull any new data frequently.

As shown in FIG. 1, the associate interaction system 160 may include any computerized apparatus that can be configured to perform any one or more of the functions of the associate interaction system 160 described and/or contemplated herein. For example, the associate of the entity may use the associate interaction system 160 to assist users during experiences with the entity. Thus, the associate interaction system 160 may transmit and/or receive information or commands to and from the system 130. As illustrated in FIG. 1, in accordance with some embodiments of the present invention, the associate interaction system 160 includes a communication interface 162, a processor 164, and a memory 156 having an associate application 167 stored therein, and an interaction interface 169. In such embodiments, the communication interface 162 is operatively and selectively connected to the processor 164, which is operatively and selectively connected to the interaction interface 169 and the memory 166. In some embodiments, the associate may use the associate application 167 to execute processes described with respect to the process flows described herein. More specifically, the associate application 167 receives and stores micro services and/or widgets on the associate interaction system 160 for use to access processed event data stored on the system 130. Furthermore, an associate of the entity may use the data generated and presented on the associate interaction system 160 via the associate application 167 to aid a user at the entity.

The communication interface 162 generally includes hardware, and, in some instances, software, that enables the associate interaction system 160, to transport, send, receive, request, and/or otherwise communicate information to and/or from the one or more other systems on the network 110. For example, the communication interface 162 of the associate interaction system 160 may include a wireless transceiver, modem, server, electrical connection, and/or other electronic device that operatively connects the associate interaction system 160 to another system such as the system 130. The wireless transceiver may include a radio circuit to enable wireless transmission and reception of information. Additionally, the associate interaction system 160 may include a positioning system. The positioning system (e.g. a global positioning system (GPS), a network address (IP address) positioning system, a positioning system based on the nearest cell tower location, Wi-Fi triangulation system, or the like) may enable at least the associate interaction system 160 or an external server or computing device in communication with the associate interaction system 160 to determine the location (e.g. location coordinates) of the associate interaction system 160.

The processor 164 generally includes circuitry for implementing the audio, visual, and/or logic functions of the associate interaction system 160. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the associate application 167 of the memory 166 of the associate interaction system 160.

The memory 166 may be used for storing the associate application 167 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may utilize the volatile memory over the non-volatile memory by storing multiple pieces of information in the volatile memory, thereby reducing the load on the system and increasing the processing speed.

The memory 166 includes the associate application 167. In some embodiments, the associate application 167 includes an interface for communicating with, navigating, controlling, configuring, and/or using the associate interaction system 160. In some embodiments, the associate application 167 includes computer-executable program code portions for instructing the processor 164 to perform one or more of the functions of the associate application 167 described and/or contemplated herein. In some embodiments, the associate application 167 may include and/or use one or more network and/or system communication protocols.

In some embodiments, the interaction interface 169 includes one or more output devices, such as a display and/or speaker, for presenting information to the user. In some embodiments, the interaction interface 169 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments the input/output devices may be the same device or a combination of devices that allow for the input or output of information to or from the user. In some embodiments, the interaction interface 169 includes the input and display devices of a mobile device, which are operable to receive and display information.

The associate interaction system 160 via the associate application 167 may receive and store the micro services on the memory 166. In this way, the micro services are small transferable modules that are built and designed to be stored on an associate device for pulling specific data points. Furthermore, the associate application 167 may refresh the deployed micro services for light analytics visualization at an associate interaction system 160. These micro services or widgets may be developed and deployed and positioned, via the associate application 167, at an interface level, such that associates within the entity may utilize the micro service to access data via any channel. Thus, the micro service may be stored on an associate machine and access the same data at every time, in a refreshed format. In this way, the associate may receive channel usage, access identification, account lifecycle information, account maintenance information, appointments, browsing, card data, communications, complaints, user maintenance, user transactions, inputs, document requests, software requests, offers provided to the user, and the like for each channel or for each user. The information provide to the associate may include one or more pictures of each of the requests based on the widget or micro services used by the associate.

Furthermore, in some embodiments, the associate application 167 may receive and allocate the plug in or implementation of additional micro services up-stream or down-stream of the already deployed micro services. These additional micro services may be received via the network 110 from the system 130. In this way, the associate application 167 may implement additional micro services on the associate interaction system 160 to perform a single function down-stream or up-stream of the function performed by the originally deployed micro services.

FIG. 2 illustrates a process flow for real-time data structuring and storage 200, in accordance with an embodiment of the invention. Typically user interaction relates to managing the interaction between an entity and its users. These interactions may be handled across multiple different channels. In this regard, the process flow includes establishing a communication link with one or more interaction channels, as shown in block 202. In today's cross-channel user interaction environments, tech-savvy users have an array of communication options to choose from to get answers to their sales and user service questions. Users may call a toll-free number using their mobile device. Users may go online and self-serve via the next generation of self-service and Virtual Agent technologies. Users may also seek out or accept a chat or click-to-call option to bypass interactive voice response (IVR) systems and menus. Users may search an online community forum (company-run or user-run) to interact with the entity. In this regard, each action performed by the user while accessing the online community forum (e.g., online banking application) may be considered as individual interaction channels. Users may look for an SMS short code and text a question. They may even download the company's mobile app to access a mobile self-service answer agent, or pull up their mobile Web site and look for a mobile chat option. And, increasingly, users may post on social media platforms in hopes that a friend, follower, or an organization's representative will respond. With the proliferation of intelligent options available, organizations may be effectively able to classify users into specific communication channels based on their needs and behaviors.

These interaction channels are capable of being accessed by a user using a user input system (e.g., a computer system, mobile device, or the like). In some embodiments, the interaction channels may be an authenticated channel or an unauthenticated channel. In one aspect, an authenticated channel may be any interaction channel established by the entity. For example, authentication channels may include, but are not limited to, inbound phone calls from the user (via a toll-free number), instant messenger initiated via an online web portal associated with the entity, accessing an application associated with the entity, a physical location associated with the entity where the a user may be provided with walk-in service, or the like. In another aspect, an unauthenticated channel may be any interaction channel not established by the entity, but capable of being accessed by the entity as authorized by the user. For example, unauthenticated channels may include, but are not limited to, social media, email, browsing history, or the like. In yet another aspect, an unauthenticated channel may be any interaction channel established by the entity to be accessed by the user, but does not authenticate the user prior to retrieving data from the interaction channel. In some embodiments, regardless of the interaction channel (authenticated or unauthenticated), the user may be required to provide additional authentication credentials for verification of the user's identity. Examples of authentication credentials include, but are not limited to, username, contact information, a password, a PIN number, biometric information (e.g., physiological features such as fingerprints, finger vein and palm vein patterns, as well as iris and facial recognition to verify individual identities), a unique identification number associated with the user, social network information, an account number, or a card number. In some embodiments, the user information may be proprietary to the entity, such as an account number, a reference number to an account, a client number, or the like. In other embodiments, the user information may be public information, such as a phone number, mailing address, email address, or the like. In doing so, the data recorded may be associated with the user and/or other data already stored and associated with the user, retrieved from one or more other interaction channels accessed by the user.

In one aspect, the data retrieved from each of the one or more interaction channels are associated with a confidence level. Typically, gaining true user insight may require ensuring that the user and prospect contact data is accurate, up-to-date and available to support interactions at any touch point. In this way, an entity may be positioned better to target and communicate information to their users. Depending on the type of interaction channel, the entity may verify one or more identifying aspects of the user, including, but not limited to, address, e-mail, or the like. In addition, the entity may determine the completion of data associated with the user indicating whether or not all the data necessary to meet the current and future business information demand are available in the data resource. In this regard, data received from the user via an authenticated interaction channel, such as an online banking application associated with a financial institution, may have a higher confidence level compared to a an unauthenticated interaction channel, such as a browsing history associated with the user.

In some embodiments, entities may mange both inbound and outbound user interactions. Inbound interactions involve a user calling because they want something at that time, e.g., information about a product or help with a problem. This presents an opportunity for the agent associated with the entity to interact with the user who is ready to share information. Outbound interactions, on the other hand, are used to target particular user groups based upon the data an entity holds about them.

Next, as shown in block 204, the process flow includes determining a first user interaction associated with at least one of the one or more interaction channels. In some embodiments, the system may be configured to determine that a first user interaction based on one or more identification information associated with the first user via the interaction channel. For example, the user may have provided a name and telephone number prior to requesting information associate with a product and/or a service. In another example, the system may be configured to detect instances of the mention of an associated entity's name and determine social media account information associated with the user for identification of the user. In some embodiments, the system may be configured to receive an indication from the one or more interaction channels identifying a first user interaction. The indication may include a type of interaction channel, nature of the interaction, information provided, or the like.

In response, the process flow includes retrieving the data associated with the first user interaction in real-time (or near real-time) via the established communication link, as shown in block 206. In one aspect, the retrieved data may be in an unstructured format. Typically, unstructured data files often include text and multimedia content. Examples include e-mail messages, word processing documents, videos, photos, audio files, presentations, webpages and many other kinds of business documents. Note that while these sorts of files may have an internal structure, they are still considered "unstructured" because the data they contain doesn't fit neatly in a database. In some embodiments, data received from the one or more interaction channels may have different latencies. In such instances, the data from different latencies may provide a better insight about an entity, a user, transaction, or business process. By monitoring and retrieving every interaction channel, the system may be configured to provide the entity with proper insight into the business operations of the user and needs of the user, thereby creating a more unified view that correlates data from multiple interaction channels. In some embodiments, the system may be configured to extract one or more features of the data, combining data from disparate interaction channels, and selecting relevant features for processing.

Next, as shown in block 208, the process flow includes transforming the data from the unstructured data format to a structured data format. In some embodiments, the system may be configured to retrieve one or more templates for data taxonomy comprising one or more fields from a database for classifying content based on content types and/or creating a hierarchy in order for the system to know how to find content quickly. In some embodiments, record code is assigned based on business purpose or business group or line of business in order to classify content. The system may then be configured to parse the data based on at least the one or more fields associated with the one or more templates. In this way, the template for data taxonomy may be used to provide an ordered list of terminology approved for tagging or categorizing a set of content. In doing so, the unstructured data may then be transformed into a structured format. In some embodiments, in response to transforming the data, the system may be configured to store the structured data in a database associated with the entity.

In response, the process flow includes processing the structured data to identify a pattern associated with the first user interaction, as shown in block 210. In this regard, the system may be configured to identify a pattern based on the data retrieved from the one or more interaction channels. In one aspect, the structured data associated with the first user interaction may be placed in one or more queues to be accessed by the first user until a pattern associated with the first user interaction is identified. In some embodiments, the queue may be stored in a cache/volatile memory to faster access and efficient data retrieval. In another aspect, the structured data associated with the first user interaction may be stored in a database associated with the entity. In some embodiments, the system may be configured to identify a pattern associated with the first user interaction based on at least the structured data stored in the one or more queues. In another embodiment, the system may be configured to identify a pattern associated with the first user interaction based on at least the structured data stored in the database. In yet another embodiment, the system may be configured to identify a pattern associated with the first user interaction based on both the structured data stored in the database and the structured data placed in the one or more queues. In this way, the system may be configured to hold the structured data in the one or more queues until a pattern emerges. In some embodiments, the available structured data may be transmitted directly to the customer and/or to other departments within the entity that may utilize the structured data for customer relationship purposes.

Next, the process flow includes determining a goal associated with the identified pattern, as shown in block 212. In this regard, the system may be configured to compare the identified pattern with one or more predetermined patters stored in a database associated with the entity to determine a match. Each pattern may be associated with one or more goals. By matching the identified pattern to one or more predetermined patterns, the system may be configured to determine one or more goals the first user is attempting to achieve. As used herein, a "goal" may be any desired result that a user envisions, plans, and commits to achieve. In one aspect, the goal may be a personal goal such as buying a house, a professional goal such as applying for college, a financial goal such as investing in the stock market. In identifying a pattern and determining a goal associated with the pattern, the system may determine one or more actions that the entity (e.g., a financial institution) may take to aid the user in achieving the determined goal. For example, a financial institution, in response to determining that the user is looking into investing in the stock market, may gather information associated with the user's financial accounts, incoming funds, outgoing funds, average savings amount, or the like. In response, the financial institution may determine an optimal type of investment account for the user to enable the user achieve the goal. In addition, the financial institution may provide the user with one or more options to open an investment account and assign a financial advisor to the user's account, whereby the user may directly contact the financial advisor directly for additional information. In this way, the present invention provides the functional benefit of "looking ahead" for the user by identifying a goal that the user wishes to achieve based on information retrieved from the one or more interaction channels accessed by the user.

Next, as shown in block 214, the process flow includes initiating a presentation of an action interface comprising one or more actions to be performed by the second user. In this regard, the system may be configured to establish a communication link with the second user device to initiate a presentation of an action interface for display on the second user device. In some embodiments, the one or more actions performed by the second user aid the first user to achieve the determined goal. For purposes of the invention, the second user is an associate of the entity. For example, the second user may be an underwriter, a project manager, an IT specialist, a manager, an administrator, an internal operations analyst, bank teller or the like, capable of operating the system described herein. For example, if the goal associated with the identified pattern is purchasing a home, the one or more actions to be performed by the second user (e.g., an associate of the financial institution) may include, but are not limited to, retrieving information associated with the user, pre-approving the user for a loan, determining an optimal interest rate, providing location analysis for buying a property based on the user's current city of residence, or the like.

The associate associated with the entity may then determine which of the one or more actions are most applicable for the user to aid the user in achieving the desired goal. For example, the associate may determine that the user's pattern indicates that the user wishes to invest in real estate, but has not provided any information regarding where the user would like to purchase the property or what type of property the user wishes to purchase. In response, the associate may not provide the user with information, rather, the associate may pose one or more questions to the user regarding specifics of the user's goal, thereby receiving more information associated with the goal. In continuing with the example presented above, the associate may present on the user interface associated with the user's device, one or more questions such as, "What type of property would you like to invest in?", "Which geographic location are you considering for your investment in real estate?", or the like.

In response to determining which of the one or more actions are most applicable for the user, the process flow includes communicating information associated with the one or more actions to the user, as shown in block 216. In this regard, the system may be configured to establish a direct communication link between the second user device and the first user device to communicate the information. As described above, the associate may present one or more questions to the user to receive additional information associated with the user's goal, whereby the associate may be able to provide the user with accurate information using the additional information.

In some embodiments, the real-time data associated with user interaction may be stored in a real-time database system. Typically, a real-time database system may have a different performance goal, correctness criteria, and assumptions about applications, however, includes all features of a traditional database system such as data independence and concurrency control. In addition to the timing constraints that originate from the need to continuously track the environment, timing correctness requirements in a real-time database system also surface because of the need to make data available to the controlling system for its decision-making activities.

FIG. 3 illustrates a process flow for aggregation and transformation of real-time data 300, in accordance with an embodiment of the invention. In this regard, the process flow includes determining a first user interaction associated with at least one of the one or more interaction channels, as shown in block 302. As described herein, the system may be configured to determine that a first user interaction based on one or more identification information associated with the first user via the interaction channel. In some embodiments, the system may be configured to receive an indication from the one or more interaction channels identifying a first user interaction. The indication may include a type of interaction channel, nature of the interaction, information provided, or the like.

Next, the process flow includes retrieving the data associated with the first user interaction in real-time (or near real-time) via the established communication link, as shown in block 304. In response, the process flow includes transforming the data from the unstructured data format to a structured data format, as shown in block 306. As described herein, the data retrieved from the interaction channels may not have a recognizable structure. The data may be unorganized and raw and can be textual and non-textual. For example, email may be unstructured textual data, as it includes time, date, recipient, sender details, subject, or the like, but an email body remains unstructured. Unstructured data may be identified as loosely structured data, wherein the data sources include a structure, but not all data in a data set follow the same structure. Transforming the data includes organizing the unstructured data using one or more pre-defined taxonomies and stored in a database in such a way that the structured data is readily searchable by simple, straightforward search engine algorithms or other search operations.

Next, the process flow includes identifying an error associated with at least a portion of the data, as shown in block 308. Typically, the errors may be a file format error, data content error, data matching error, and/or the like indicating that the data that is unrecognizable, incomplete, invalid, and/or the like. In this regard, if an error in the data is detected, the system may be configured to generate a report detailing the error. In some embodiments, the report may include one or more error codes that may be interpreted to identify the exact nature of the error.

Next, in response to identifying an error, the process flow includes determining a time stamp and an interaction channel associated with the portion of data identified to be in error, as shown in block 310. In this way, the system may be configured to determine when the error occurred. In doing so, the portion of data identified to be in error may be reviewed for data correction and re-processing. In response, the process flow includes replaying the data associated with the first user interaction retrieved from the determined interaction channel and the time stamp associated with the portion of data identified to be in error, as shown in block 312. In some embodiments, the time stamp associated with the portion of the data identified to be in error may include a starting time stamp and an ending time stamp. In one aspect, the starting time stamp may indicate a starting time associated with the portion of the data identified to be in error. In another aspect, the ending time stamp may indicate an ending time associated with the portion of the data identified to be in error. In this way, the portion of data identified to be in error may be identified accurately. In some embodiments, when the data retrieved from the one or more interaction channels are processed, the portion of data identified to be in error may not be processed. Once the data retrieved from the one or more interaction channels are transformed, the data is stored in the database. The portion data identified to be in error may then be replayed and prepared for re-processing.

In this regard, the process flow then includes processing the portion of data identified to be in error to rectify the error, as shown in block 314. In some embodiments, the portion of data identified to be in error may be manually processed to rectify the error. In some other embodiments, the portion of data identified to be in error may be automatically processed to rectify the error. In one aspect, rectifying the portion of data identified to be in error may include manually adding additional data. In another aspect, rectifying the portion of data identified to be in error may include dropping a portion of the data. In yet another aspect, rectifying the portion of data identified to be in error may include requesting retransmission of data from the interaction channel associated with the portion of the data identified to be in error. Once the portion of the data identified to be in error is rectified, the system may then be configured to transform the unstructured data into a structured format.

In response, the process flow includes storing the transformed portion of data in the database, as shown in block 316. In some embodiments, the transformed portion of data is stored in the database based on at least the time stamp associated with the portion of data identified to be in error. In this way, the system may be configured to maintain data continuity by storing the data in the database according to the starting time stamp and the ending time stamp associated with the portion of the data identified to be in error.

FIG. 4 illustrates a user interface 600, in accordance with an embodiment of the invention. Once the data is stored in the database it may be accessed and/or illustrated via images presented to associates or users via interfaces. In some embodiments, interfaces may be directed to specifically requested information driven by micro services designed to extract and compile that specific type of data. In this way, the micro services may be utilized to create a light analytics for any number of queries requested. For example, one query may be how many users were at a particular entity store within the last 30 days.

In some embodiments, the user interface 600 may be user specific. In this way, the query for the user interface requests information about the user. As illustrated, the interface 600 provides the requestor with a view of the user based on channel activity. The interface 600, in this example is for User 1. The interface 600 comprises a user profile 602. The user profile 602 may be a quick view of the relationship the user has with the entity. This may be accounts the user has with the entity, rewards, or the like. The user profile may include a photographic representation of the user, such that an associate may recognize the user.

In some embodiments, the interface 600 may include the top opportunities 604 for the user. These may be offers, programs, or other benefits that may be identified as potentially being desired by the user based on the user's relationship, recent activities, channel usage, or the like.

As illustrated, the interface 600 further comprises a relationship summary 606. The relationship summary may include relationships that the user has with the entity and a status associated therewith. The relationship may include an account, a program, follow ups, appointments, or the like the user may have with the entity. Furthermore, the status, such as a balance, credit, pending, or the like may be assigned to each relationship.

Furthermore, the interface 600 includes information about the user's recent actions 608 and the user's channel usage 610. The recent actions 608 section includes a list of the last few actions a user performed in association with the entity. These actions may include a positive action or a negative action. The recent actions 608 section may also include a date and time associated with the action. For example, if the entity is a financial institution, the recent actions 608 may include credit card payments, deposits, withdraws, or the like. This may also include a location and time of each of the recent actions. The channel usage 610 section indicates the channel and the usage of that channel for the user over a period of time. In this way, it can be identified as to which channels the user tends to utilize the most when communicating with the entity.

As illustrated, the interface 600 further comprises a key enrolled services 612 section. In this section, the key services or products that the user is enrolled in may be graphically or pictorially illustrated in the interface. Finally, the interface 600 contains additional tabs that may be selected to drill down additional detail about the user.

FIG. 5 illustrates a process flow for providing a channel accessible single function micro service data collection process used for light analytics 400, in accordance with an embodiment of the invention. Utilizing micro services the invention may start to build out a decoupled channel architecture, as illustrated in block 402. Typical channel architectures are tightly coupled, thus when an update or change is implemented to one or more parts of the architecture, it is not known what effect that change will have on other parts of the tightly coupled infrastructure. Thus, generating decoupled channel architecture allows for As illustrated in block 404, the process continues by generating one or more single function small module micro services for channel use. These micro services are created to provide one function within the data collection process. The micro services are built as small transferable modules to be a single function high efficiency small module. In this way, the constructed micro services do not require high end server networks to run, but instead run via a simplistic process. In this way, the data collection process is easily constructed using one or more various micro services based on the entities required needs.

As illustrated in block 406, the process 400 continues by deploying the developed micro services at the interface level for any channel. The deployed micro services may pull data frequently and create a light analytic system. For example, a micro service can pull all data within a time frame that when to a specific channel, when to a specific channel for a particular purpose, or the like. The micro services will refresh regularly and pull any new data frequently.

Next, as illustrated in block 408, the process continues by allowing storage of the micro services on associate interaction systems. In this way, the micro services are small transferable modules that are built and designed to be stored on an associate device for pulling specific data points. As illustrated in block 410, the micro services allow for multiple refreshing of the deployed micro services for light analytics visualization at an associate interaction system. These micro services or widgets may be developed and deployed at an interface level, such that associates within the entity may utilize the micro service to access data via any channel. Thus, the micro service may be stored on an associate machine and access the same data at every time, in a refreshed format. In this way, the associate may receive channel usage, access identification, account lifecycle information, account maintenance information, appointments, browsing, card data, communications, complaints, user maintenance, user transactions, inputs, document requests, software requests, offers provided to the user, and the like for each channel or for each user. The information provide to the associate may include one or more pictures of each of the requests based on the widget or micro services used by the associate.

As illustrated in block 412, the process 400 continues by allowing plug in or implementation of additional micro services up-stream or down-stream of the already deployed micro services. In this way, the additionally implemented micro services may be implemented to perform a single function down-stream or up-stream of the function performed by the originally deployed micro services. Finally, as illustrated in block 414 the process 400 finishes by storing the data pulled by the micro services in a separate database for future light analytics.

FIG. 6 illustrates a process flow for a micro services data processing analytics framework 500, in accordance with some embodiments of the invention. The framework allows for processing of the raw interaction data that the one or more deployed micro services ingests. In this way, the framework provides for advanced operational execution not possible by the micro services. The framework allows for real-time analytics on interaction data. Furthermore, the framework may include pivot data or other user data other than interaction data that the framework may desire to pivot off of. This data may include, for example, user offers (accepted, denied, or received), geographic data, culture mapping, and the like. The pivot data may allow visualization of a holistic view of a user or customer to better service that customer.

As illustrated in block 504, the process 500 in initiated by receiving the raw interaction data from one or more deployed micro services in real-time. As illustrated on block 505, the process 500 continues by receiving or extracting pivot data associated with the user. The pivot data may include data about or associated with a user that the framework may utilize in association with the interaction data to provide a better user view. This data may include, for example, user offers (accepted, denied, or received), geographic data, culture mapping, and the like. The pivot data may allow visualization of a holistic view of a user or customer to better service that customer.

Next, as illustrated in block 506, the raw interaction data may be stored in a designated database. In some embodiments, the micro services may send and store the data. In other embodiments, the framework may receive the raw data from the micro services and store the interaction data in a designated database.

Next, as illustrated in block 508, the framework may perform processing of the raw interaction data. In this way, the system may structure the raw data and rearrange the data in real-time. The processing may include machine learning predictive analytics framework, business rule generation and creation, or the like. In this way, the framework performs complex analytics. For example, the processing may identify opportunities, identify how to act or approach one or more users, determine stalls in user/entity interaction, determine time usage for a process, or the like. As such, the system may apply machine learning and/or business rules to the interaction data based on analytics demands or requirements, as illustrated in block 510. In this way, the system may learn from the data received at the micro servers in real-time. Furthermore, the system may also accept business rules implemented by the entity to provide associates with flags or alerts when data triggers one or more of the rules.

Machine learning analytics includes artificial intelligence that allows a learning of how to communicate effectively with each user. In this way, the machine learning analytics includes a culture mapping of user such as languages, demographics, geographic location, or the like associated with the user.

In this way, the framework is embedding artificial intelligence and machine learning into a real-time interaction channel environment. In this way, the system may self-learn in real-time and/or self-heal in real-time. In this way, upon a negative interaction with a user, the system may learn and identify positive interaction characteristics for that user and implement them in the future, thus allowing for self-healing of channel interactions.

As illustrated in block 512, the system may continue to monitor the raw interaction data based on the implemented business rules and machine learning to issue future alerts if necessary. As illustrated in block 514, the system may calculate analytics and perform advanced operation executions based on the demands/requests and/or rules. A calculation, for example, may be to determine the time usage for a process and identify a typical time for that process to take. Then, the system may identify or flag real-time interaction data that indicates when the process took longer than the typical time frame. The system may generate an alert or other flag for associate review based on the analytics. Finally, as illustrated in block 516, the process is completed by presenting data in an interface picture based on the calculated analytics.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/871,079 | SYSTEM FOR AGGREGATION AND TRANSFORMATION OF REAL-TIME DATA | Sep. 30, 2015 |
| 14/870,801 | CHANNEL ACCESSIBLE SINGLE FUNCTION MICRO SERVICE DATA COLLECTION PROCESS | Sep. 30, 2015 |

-continued

| U.S. patent application Ser. No. | Title | Filed On |
|---|---|---|
| 14/870,805 | FOR LIGHT ANALYTICS SYSTEM FRAMEWORK PROCESSOR FOR CHANNEL CONTACTS | Sep. 30, 2015 |

What is claimed is:

1. A system for real-time data structuring and storage, the system comprising:
at least one non-transitory storage device;
at least one processor; and
at least one module stored in said storage device and comprising instruction code that is executable by the at least one processor and configured to cause said at least one processor to:
establish a communication link with one or more interaction channels, wherein the one or more interaction channels are capable of being accessed by a first user using a first user device, wherein the one or more interaction channels are associated with a financial institution, wherein the one or more interaction channels comprises authenticated channels and unauthenticated channels, wherein the authenticated channels are interaction channels that are established by the financial institution and is directly associated with the financial institution, wherein the unauthenticated channels are interaction channels that are not established by the financial institution but are capable of being accessed by the financial institution as authorized by the first user;
determine a first user interaction associated with at least one of the one or more interaction channels;
retrieve data associated with the first user interaction in real-time via the established communication link, wherein the data is in an unstructured data format;
transform the data from the unstructured data format to a structured data format;
place the structured data associated with each of the one or more interaction channels accessed by the first user in one or more queues, wherein each structured data is queued until a pattern associated with the first user interaction is identified;
identify a pattern associated with at least a portion of the structured data stored in the one or more queues;
transfer the portion of the structured data associated with the identified pattern from the one or more queues to a database, wherein a remainder of the structured data remains queued;
identify an error associated with at least the portion of the structured data in the database;
determine a time stamp and an interaction channel associated with the portion of the structured data identified to be in error in the database;
replay the data associated with the first user interaction retrieved from the interaction channel and the time stamp associated with the portion of the structured data identified to be in error in the database;
replace, in the database, the portion of the structured data determined to be in error with the replayed data, wherein the replayed data is stored in the database based on the time stamp associated with the portion of data identified to be in error;
compare the pattern with one or more predetermined patterns, wherein the one or more predetermined patters are associated with one or more goals;
determine a goal associated with the first user based on at least comparing the pattern with the one or more predetermined patterns;
establish a communication link with a second user device to initiate a presentation of an action interface for display on the second user device, wherein the action interface comprises one or more actions to be performed by the second user, wherein the one or more actions aid the first user to achieve the determined goal; and
establish a direct communication link between the second user device and the first user device to communicate information associated with the one or more actions from the second user device to the first user to enable the first user achieve the goal.

2. The system of claim 1, wherein the data received via the established communication link with the authentication interaction channel is more reliable than the data received via the established communication link with the unauthenticated channel.

3. The system of claim 1, wherein the data received from each of the one or more interaction channels are associated with a confidence level, wherein the confidence level associated with data received from authenticated channels is greater than the confidence level associated with the data received from unauthenticated channels, wherein the confidence levels are an indication of the reliability of the data.

4. The system of claim 1, wherein the module is further configured to:
retrieve one or more templates for data taxonomy from a template database, wherein each of the one or more templates comprises one or more fields;
parse the data based on at least the one or more fields associated with the one or more templates; and
transform the data into a structured format based on at least parsing the data into the one or more fields associated with the one or more templates.

5. The system of claim 1, wherein the module is further configured to:
transform the data received from each of the one or more interaction channels from an unstructured format to a structured format; and
store the structured data in the database.

6. The system of claim 5, wherein the module is further configured to:
retrieve data associated with each of the one or more interaction channels accessed by the first user in real-time via the established communication link;
dynamically transform the data from an unstructured format to a structured format;
place the structured data into one or more queues; and
identify the pattern based on at least the structured data placed in the one or more queues and structured data stored in the database.

7. A computer program product for real-time data structuring and storage, the computer program product comprising a non-transitory computer-readable medium comprising code causing a first apparatus to:
establish a communication link with one or more interaction channels, wherein the one or more interaction channels are capable of being accessed by a first user using a first user device, wherein the one or more interaction channels are associated with a financial institution, wherein the one or more interaction channels comprises authenticated channels and unauthenticated channels, wherein the authenticated channels are interaction channels that are established by the financial institution and is directly associated with the financial institution, wherein the unauthenticated channels are interaction channels that are not established by the financial institution but are capable of being accessed by the financial institution as authorized by the first user;

determine a first user interaction associated with at least one of the one or more interaction channels;

retrieve data associated with the first user interaction in real-time via the established communication link, wherein the data is in an unstructured data format;

transform the data from the unstructured data format to a structured data format;

place the structured data associated with each of the one or more interaction channels accessed by the first user in one or more queues, wherein each structured data is queued until a pattern associated with the first user interaction is identified;

identify a pattern associated with at least a portion of the structured data stored in the one or more queues;

transfer the portion of the structured data associated with the identified pattern from the one or more queues to a database, wherein a remainder of the structured data remains queued;

identify an error associated with at least the portion of the structured data in the database;

determine a time stamp and an interaction channel associated with the portion of the structured data identified to be in error in the database;

replay the data associated with the first user interaction retrieved from the interaction channel and the time stamp associated with the portion of the structured data identified to be in error in the database;

replace, in the database, the portion of the structured data determined to be in error with the replayed data, wherein the replayed data is stored in the database based on the time stamp associated with the portion of data identified to be in error;

compare the pattern with one or more predetermined patterns, wherein the one or more predetermined patters are associated with one or more goals;

determine a goal associated with the first user based on at least comparing the pattern with the one or more predetermined patterns;

establish a communication link with a second user device to initiate a presentation of an action interface for display on the second user device, wherein the action interface comprises one or more actions to be performed by the second user, wherein the one or more actions aid the first user to achieve the determined goal; and establish a direct communication link between the second user device and the first user device to communicate information associated with the one or more actions from the second user device to the first user to enable the first user achieve the goal.

8. The computer program product of claim 7, wherein the data received via the established communication link with the authentication interaction channel is more reliable than the data received via the established communication link with the unauthenticated channel.

9. The computer program product of claim 7, wherein the data received from each of the one or more interaction channels are associated with a confidence level, wherein the confidence level associated with data received from authenticated channels is greater than the confidence level associated with the data received from unauthenticated channels, wherein the confidence levels are an indication of the reliability of the data.

10. The computer program product of claim 7, wherein the firs apparatus is further configured to:

retrieve one or more templates for data taxonomy from a template database, wherein each of the one or more templates comprises one or more fields;

parse the data based on at least the one or more fields associated with the one or more templates; and transform the data into a structured format based on at least parsing the data into the one or more fields associated with the one or more templates.

11. The computer program product of claim 7, wherein the first apparatus is further configured to:

transform the data received from each of the one or more interaction channels from an unstructured format to a structured format; and store the structured data in the database.

12. The computer program product of claim 11, wherein the first apparatus is further configured to:

retrieve data associated with each of the one or more interaction channels accessed by the first user in real-time via the established communication link;

dynamically transform the data from an unstructured format to a structured format;

place the structured data into one or more queues; and identify the pattern based on at least the structured data placed in the one or more queues and structured data stored in the database.

13. A computer implemented method for real-time data structuring and storage, the method comprising:

establishing a communication link with one or more interaction channels, wherein the one or more interaction channels are capable of being accessed by a first user using a first user device, wherein the one or more interaction channels are associated with a financial institution, wherein the one or more interaction channels comprises authenticated channels and unauthenticated channels, wherein the authenticated channels are interaction channels that are established by the financial institution and is directly associated with the financial institution, wherein the unauthenticated channels are interaction channels that are not established by the financial institution but are capable of being accessed by the financial institution as authorized by the first user;

determining a first user interaction associated with at least one of the one or more interaction channels;

retrieving data associated with the first user interaction in real-time via the established communication link, wherein the data is in an unstructured data format;

transforming the data from the unstructured data format to a structured data format;

placing the structured data associated with each of the one or more interaction channels accessed by the first user in one or more queues, wherein each structured data is queued until a pattern associated with the first user interaction is identified;

identifying a pattern associated with at least a portion of the structured data stored in the one or more queues;

transferring the portion of the structured data associated with the identified pattern from the one or more queues to a database, wherein a remainder of the structured data remains queued;

identifying an error associated with at least the portion of the structured data in the database;

determining a time stamp and an interaction channel associated with the portion of the structured data identified to be in error in the database;

replaying the data associated with the first user interaction retrieved from the interaction channel and the time stamp associated with the portion of the structured data identified to be in error in the database;

replacing, in the database, the portion of the structured data determined to be in error with the replayed data, wherein the replayed data is stored in the database based on the time stamp associated with the portion of data identified to be in error;

comparing the pattern with one or more predetermined patterns, wherein the one or more predetermined patterns are associated with one or more goals;

determining a goal associated with the first user based on at least comparing the pattern with the one or more predetermined patterns;

establishing a communication link with a second user device to initiate a presentation of an action interface for display on the second user device, wherein the action interface comprises one or more actions to be performed by the second user, wherein the one or more actions aid the first user to achieve the determined goal; and establishing a direct communication link between the second user device and the first user device to communicate information associated with the one or more actions from the second user device to the first user to enable the first user achieve the goal.

14. The computer implemented method of claim 13, wherein the data received via the established communication link with the authentication interaction channel is more reliable than the data received via the established communication link with the unauthenticated channel.

15. The computer implemented method of claim 13, wherein the data received from each of the one or more interaction channels are associated with a confidence level, wherein the confidence level associated with data received from authenticated channels is greater than the confidence level associated with the data received from unauthenticated channels, wherein the confidence levels are an indication of the reliability of the data.

16. The computer implemented method of claim 13, wherein the method further comprises:

retrieving one or more templates for data taxonomy from a template database, wherein each of the one or more templates comprises one or more fields;

parsing the data based on at least the one or more fields associated with the one or more templates; and transforming the data into a structured format based on at least parsing the data into the one or more fields associated with the one or more templates.

17. The computer implemented method of claim 13, wherein transforming further comprises placing the structured data associated with each of the one or more interaction channels accessed by the first user in one or more queues, wherein each structured data is queued until a pattern associated with the first user interaction is identified.

18. The computer implemented method of claim 13, wherein the method further comprises:

transforming the data received from each of the one or more interaction channels from an unstructured format to a structured format; and storing the structured data in the database.

* * * * *